United States Patent
Kim et al.

(10) Patent No.: US 9,438,136 B2
(45) Date of Patent: Sep. 6, 2016

(54) CONVERTER FOR ELECTRIC POWER

(71) Applicant: HYOSUNG CORPORATION, Seoul (KR)

(72) Inventors: June Sung Kim, Anyang-si (KR); Tae Gyun Kim, Seoul (KR); Hang Jun Yang, Seoul (KR); Jong Yun Choi, Hwaseong-si (KR)

(73) Assignee: HYOSUNG CORPORATION, Seoul (KR)

( * ) Notice: Subject to any disclaimer, the term of this patent is extended or adjusted under 35 U.S.C. 154(b) by 0 days.

(21) Appl. No.: 14/758,060

(22) PCT Filed: Dec. 27, 2013

(86) PCT No.: PCT/KR2013/012355
§ 371 (c)(1),
(2) Date: Jun. 26, 2015

(87) PCT Pub. No.: WO2014/104848
PCT Pub. Date: Jul. 3, 2014

(65) Prior Publication Data
US 2015/0333660 A1    Nov. 19, 2015

(30) Foreign Application Priority Data

Dec. 28, 2012 (KR) .................... 10-2012-0157392

(51) Int. Cl.
*H02M 7/797* (2006.01)
*H02M 1/32* (2007.01)
*H02M 7/483* (2007.01)

(52) U.S. Cl.
CPC .............. *H02M 7/797* (2013.01); *H02M 1/32* (2013.01); *H02M 7/483* (2013.01); *H02M 2001/325* (2013.01); *H02M 2007/4835* (2013.01)

(58) Field of Classification Search
CPC ......... H02M 2007/4835; H02M 7/49; H02M 5/4585; H02M 1/12; H02M 1/14; H02M 1/44; H02M 1/32; H02M 7/797; H02M 2001/325; H02M 7/219; H02M 7/757; H02J 3/36; Y02E 60/60
See application file for complete search history.

(56) References Cited

U.S. PATENT DOCUMENTS

2008/0310205 A1\* 12/2008 Hiller .................... H02M 7/483
                                                                363/131
2010/0118453 A1   5/2010 Dorn et al.
2013/0063995 A1\* 3/2013 Norrga ................... H02M 1/32
                                                                363/125

FOREIGN PATENT DOCUMENTS

| JP | 2000-175435 A | 6/2000 |
| JP | 2009-506736 A | 2/2009 |
| JP | 2011-193615 A | 9/2011 |

OTHER PUBLICATIONS

STIC Search Report.\*

*Primary Examiner* — Adolf Berhane
*Assistant Examiner* — Henry Lee, III
(74) *Attorney, Agent, or Firm* — Novick, Kim & Lee, PLLC; Jae Youn Kim

(57) ABSTRACT

The present invention relates to a converter for electric power having multiple sub-modules connected in series, the sub-modules having an energy storage unit and multiple power semiconductor circuits connected in parallel to the energy storage unit, and which causes an electric current to bypass a sub-module in case the breakdown of the sub-module occurs. To this end, the converter for electric power according to the present invention has multiple sub-modules connected to each other in series, the sub-modules having an energy storage unit and at least one power semiconductor circuit that is connected in parallel to the energy storage unit and comprises multiple power semiconductor switches and freewheeling diodes, wherein each of the sub-modules comprises a bypass switching unit, which is connected in parallel to any one of said at least one power semiconductor circuit, and bypasses an electric current via the bypass switching unit.

9 Claims, 6 Drawing Sheets

CONVERTER FOR ELECTRIC POWER

TECHNICAL FIELD

The present invention generally relates to a converter for electric power. More particularly, the present invention relates to an electric power converter in which multiple sub-modules, including an energy storage unit and multiple power semiconductor circuits connected to the energy storage unit, are connected in series. The electric power converter causes current to bypass a sub-module when the sub-module fails.

BACKGROUND ART

Generally, a converter for high voltage uses a power semiconductor, which is turn-on/turn-off controlled for mutual conversion between AC voltage and DC voltage. Because the withstand voltage of the power semiconductor is limited, multiple semiconductor modules having a power semiconductor circuit should be connected in series to process the high voltage. Various semiconductor modules may be connected with each other for a power semiconductor circuit configuration.

As it is known, in the case of a well-known modular multilevel converter (MMC), the power semiconductor circuit includes multiple sub-modules that form two output terminals, and the multiple sub-modules are connected to each other in series. Such sub-modules may be configured to include, for example, an energy storage unit and a power semiconductor circuit, which is connected to the energy storage unit in parallel and comprises multiple power semiconductor switches and free-wheel diodes.

When a certain sub-module fails among these multiple sub-modules, the failing sub-module is shorted to stably operate a system. For a short circuit, a phase current bypasses the failing sub-module by a bypass switch, and the system continuously performs normal operations by other normal sub-modules.

In this case, a technique for quickly bypassing a failing sub-module is very important in terms of a system as well as the corresponding sub-module. If the switching time of the bypass switch is slow, overvoltage and overcurrent are generated in the failing module. Accordingly, the internal components (for example, capacitors, power semiconductors, etc.) of the corresponding sub-module may explode and may lead to a fire. Also, as overvoltage and overcurrent are generated in the whole system, and overvoltage and overcurrent respectively exceeding a rated voltage and a rated current are applied to each sub-module, the reliability of the system is adversely affected. Therefore, the bypass switch must quickly operate and must be stable, but the conventional art may not maintain desired performance due to technological limitations.

Recently, various circuit configurations are proposed for the bypass of a phase current when a sub-module fails. However, these have unilateral circuits and it is difficult to perform an effective bypass operation.

DISCLOSURE

Technical Problem

Accordingly, the present invention has been made keeping in mind the above problems occurring in the conventional art, and an object of the present invention is to provide an electric power converter that causes a current to bypass a sub-module when the corresponding sub-module fails.

Another object of the present invention is to provide an electric power converter capable of reducing the overall bypass operation time required for shorting a failing sub-module even though the bypass switch of which the operation time is slow is used in the electric power converter in which multiple sub-modules are connected in series.

A further object of the present invention is to provide an electric power converter designed to reduce the cost by using a bypass switch of which the operating time is slow but the cost is low.

Yet another object of the present invention is to provide an electric power converter enabling the effective bypass of a current because of a bidirectional bypass switch.

Technical Solution

In order to accomplish the above object, the present invention provides an electric power converter in which multiple sub-modules (10), including an energy storage unit (110) and one or more power semiconductor circuits (120) connected to the energy storage unit (110) in parallel, are connected with each other in series, the power semiconductor circuit including multiple power semiconductor switches (121, 123) and free-wheel diodes (122, 124). Each of the sub-modules (10) includes a bypass switch unit (130) that is connected to a power semiconductor circuit connected between two output terminals (X1, X2), among the power semiconductor circuits (120), and the electric power converter bypasses a current through the bypass switch unit (130).

In the present invention, the bypass switch unit (130) includes a first switch element (131) connected to one among the power semiconductor circuits (120), a diode (132) connected to the first switch element (131) in anti-parallel, and a second switch element (133) connected to the diode (132) in parallel; a cathode side of the first switch element (131) is connected to an emitter side of the power semiconductor switch (123) of the power semiconductor circuit (120); and the current flows through the diode (132) and the first switch element (131) when the sub-module (10) fails, and the current is bypassed through the second switch element (133) after a switching operation of the second switch element (133).

In the present invention, the first switch element (131) includes a semiconductor switch or a power semiconductor switch, and the second switch element (133) includes a mechanical switch.

In the present invention, the first switch element (131) includes an SCR.

In the present invention, the bypass switch unit (130) includes a first switch element (131) connected in parallel to a power semiconductor circuit connected between two output terminals, among the power semiconductor circuits (120), a third switch element (132') connected to the first switch element (131) in anti-parallel, and a second switch element (133) connected to the third switch element (132') in parallel; a cathode side of the first switch element (131) is connected to an emitter side of the power semiconductor switch (123) of the power semiconductor circuit (120); and the current flows through the third switch element (132') and the first switch element (131) when the sub-module (10) fails, and the current is bypassed through the second switch element (133) after a switch operation of the second switch element (133).

In the present invention, the first switch element (131) and the third switch element (132') include an SCR element.

In the present invention, an anode side of the third switch element (132') is connected to a cathode side of the first switch element (131).

In the present invention, a switching operation time of the second switch element (133) is 6 to 10 milliseconds.

Advantageous Effects

According to the present invention as described above, the electric power converter has the following effects.

According to the present invention, though an electric power converter in which multiple sub-modules are connected in series does not reduce an operating time of the bypass switch for quickly shorting a failing sub-module, the overall bypass operation time may be reduced by preferentially operating a fast semiconductor element for electric power.

Also, according to the present invention, as a relatively slow bypass switch is used compared to the conventional art, the cost may be reduced.

Furthermore, according to the present invention, because the bypass switch is a bidirectional switch, effective bypass is possible when a sub-module fails, and thus a system may operate stably.

BEST MODE

Hereinafter, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted.

The present invention provides an electric power converter. In the electric power converter according to the present invention, multiple sub-modules are connected in series. Especially, when a certain sub-module fails, the electric power converter is operated by other normal sub-modules by making a phase current bypass the failing sub-module to prevent stopping of the operation of the converter, an explosion, a fire, the generation of overvoltage and overcurrent in the system, and the like.

Figure 1:
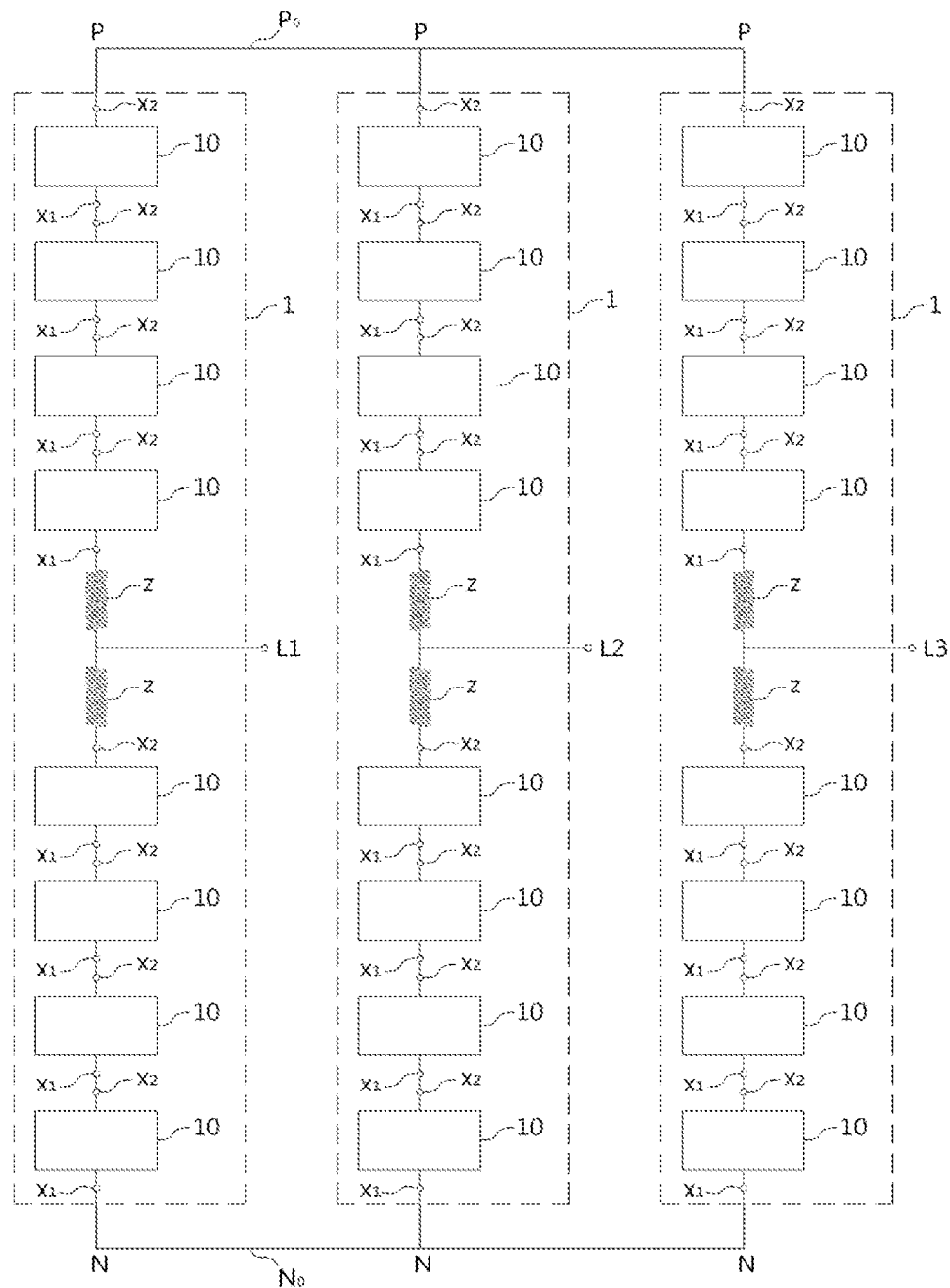
FIG. 1 is an exemplary equivalent circuit diagram of an electric power converter according to an embodiment of the present invention.

FIG. 1 is an equivalent circuit diagram of an electric power converter according to an embodiment of the present invention.

Referring to FIG. 1, an electric power converter according to the present invention includes one or more phase modules 1, and in each of the phase modules 1, multiple sub-modules 10 are connected in series. Also, each of the phase modules 1 connects the DC voltage sides to positive and negative DC voltage bus-bars P0 and N0. DC voltage, though not illustrated in FIG. 1, is present between the DC voltage bus-bars P0 and N0. Each of the phase modules 1 has an intermediate AC voltage terminal and two outer DC voltage terminals as a load connection terminal. One phase module arm (z) is formed between the intermediate AC voltage terminal and each of the outer DC voltage terminals, and the phase module arm (z) becomes the series circuit of a sub-module 10. Each of the sub-modules 10, connected in series in each of the phase module 1, forms two connection terminals, that is, a first connection terminal X1 and a second connection terminal X2.

The electric power converter configured as the above-description may be formed as a part of equipment for transmitting high-voltage current, and serves to connect AC voltage power systems with each other to transmit high power between the systems. Also, the electric power converter may be a part of FACTS equipment that stabilizes the system or guarantees desired voltage quality. Furthermore, the converter illustrated in FIG. 1 may be used in the power driving technology.

Especially, in the electric power converter according to the present invention, when a sub-module 10 fails, the failing sub-module 10 is shorted to prevent an open circuit of the phase module 1. The phase current bypasses the failing sub-module 10 by the short circuit, and the phase module 1 is normally operated by a phase current that flows through other normal sub-modules 10. In this case, the present invention includes a bypass switch unit (reference numeral 130 in FIG. 2) in the sub-module 10, which serves as a short-circuiting device to short the sub-module 10. The bypass switch unit 130 is controlled by the control signal of a control unit to short the sub-module within a few milliseconds after the fail. Therefore, a normal phase current flows through multiple sub-modules 10 during the normal operation, but when a certain sub-module 10 fails, the failing sub-module is shorted by the operation of the bypass switch unit 200 and the phase current is bypassed through the bypass switch unit 130. Accordingly, the phase module 1 is protected.

Figure 2:
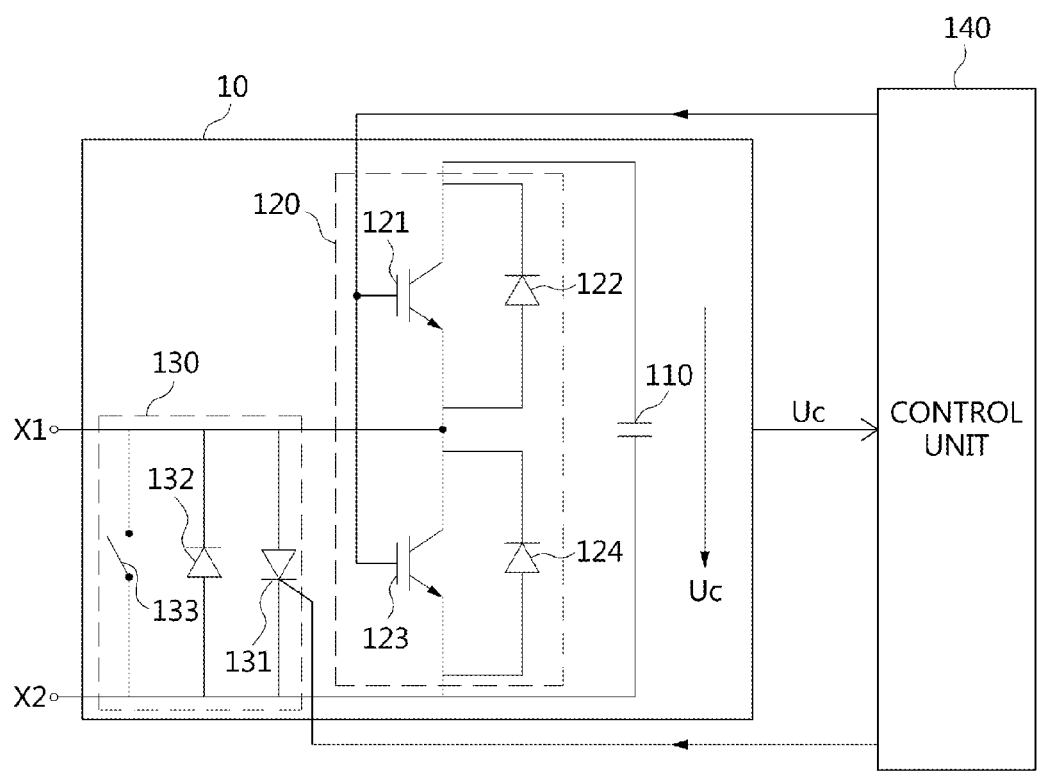
FIG. 2 is an equivalent circuit diagram of a sub-module in an electric power converter according to the present invention.

FIG. 2 is an equivalent circuit diagram of a sub-module in an electric power converter according to the present invention.

Referring to FIG. 2, in the electric power converter according to the present invention, each of the sub-modules 10 comprises an energy storage unit 110 and one or more power semiconductor circuits 120 connected to the energy storage unit 110 in parallel. The power semiconductor circuits 120 are connected with each other in series. Each of the power semiconductor circuits 120 includes power semiconductor switches 121 and 123 that are turn-on/turn-off controlled, and free-wheel diodes 122 and 124 respectively connected to the power semiconductor switches 121 and 123 in anti-parallel. In another embodiment, each of the sub-modules 10 may be variously implemented by arranging the energy storage unit 110 and the one or more power semiconductor circuits 120, differently from FIG. 2.

Also, in the sub-module 10 according to the present invention, the bypass switch unit 130 is connected in parallel to any one among the power semiconductor circuits 120. FIG. 2 illustrates an example in which the bypass switch unit is connected to the power semiconductor circuit in the lower side in parallel among the two power semiconductor circuits 120, but it may be connected to the power semiconductor circuit in the upper side. In this case, desirably, the bypass switch unit is connected in parallel to the power semiconductor circuit that is connected between the two output terminals X1 and X2 of the sub-module 10. For example, when the two output terminals X1 and X2 are linked to the both ends of the upper power semiconductor circuit, the bypass switch unit may be connected to the upper power semiconductor in parallel. The bypass switch unit 130 causes the phase current to bypass a sub-module when the corresponding sub-module 10 fails. In this case, the bypass operation of the bypass switch unit 130 should be performed within a short duration. Otherwise, overvoltage and overcurrent are generated in the failing sub-module 10, and the internal components (capacitors and power semiconductors) of the corresponding sub-module 10 may explode and a fire may be caused. Also, as overvoltage and overcurrent are generated in the whole system, and overvoltage and overcurrent respectively exceeding a rated voltage and a rated current are applied to each of the sub-modules 10, the reliability of a system may be adversely affected. Therefore, it is desirable that the bypass operation is performed within a few milliseconds after the fail.

To this end, the bypass switch unit 130 of the sub-module 10 according to the present invention comprises a first switch element 131 connected to any one of power semiconductor circuits 120 in parallel, a diode 132 connected to the first switch element in anti-parallel, and a second switch element 133 connected to the diode 132 in parallel. Desirably, the bypass switch unit 130 is connected in parallel to the power semiconductor circuit 120 that is connected between the two output terminals X1 and X2. In the embodiment, the first switch element 131 includes, for example, a silicon controller rectifier (SCR) element. The SCR element, as a thyristor, is turned on by the signal of a control unit 140. Specifically, in the example of FIG. 2, the first switch element 131, which is connected to a certain power semiconductor circuit 120 in parallel, is turned on when a signal is input from the control unit 140, and sends the current. The cathode side of the first switch unit 131 is connected to the emitter side of the power semiconductor switch 123 of the power semiconductor circuit 120. Also, the diode 132 is connected to the first switch element 131 in anti-parallel. Generally, the second switch element 133 is implemented as a well-known mechanical configuration of switch.

A bypass operation in the bypass switch unit 130 configured as the above-description is described. When a certain sub-module 10 fails, the second switch element 133 is switched and the current is bypassed through the second switch element 133. However, as mentioned in the conventional art, because it is difficult to quicken the switching operation time of the second switch element 133, high instantaneous current may be provided to the sub-module 10. Technical development has been made in reducing the switching operation time of the second switch element 133, but high technical skill is required and much time and expenses are spent achieving such a goal. Accordingly, the present invention uses the second switch element 133 of which the switching operation time is relatively long, but additionally includes the first switch element 131 and the diode 132 to reduce the overall bypass operation time. Therefore, when a sub-module 10 fails, the fault current preferentially flows through the diode 132 and the first switch element 131. Then, the second switch element 133 is switched and the current is bypassed.

As described above, though the present invention uses the second switch element 133 of which the switching time is relatively long, the bypass operation may be quickly performed in the bypass switch unit 130. The current flow through the second switch element 133 is substituted with the current flow through the combination of the diode 132 and the first switch element 131, and then the current is bypassed by sending the current through the second switch element 133 depending on the switching operation of the second switch element 133.

Practically, in the case of the electric power converter according to the conventional art, 3 to 4 milliseconds switching operation time of the second switch element 133 is required for the stable system operation. However, in the present invention, though the second switch element 133 of which the switching operation time is 6 to 10 milliseconds is used, the quicker bypass operation time, which is 1 to 2 milliseconds, may be implemented by the combination of the first switch element 131 and the diode 132. This is because the second switch element 133 is generally formed by a mechanical configuration, whereas the combination of the first switch element 131 and the diode 133 is formed by an electrical configuration. Therefore, the limitations in the bypass operation time, caused by the mechanical operation, may be reduced.

The switching operation time of the second switch element 133 is very important because it determines the spread of the fail of the sub-module 10 and the magnitude of the current flowing after a certain operation time. In other words, as the switching operation time of the switch 133 is longer, the possibility of a fire increases in the failing sub-module 10, and the fire leads to a secondary accident in the surrounding sub-modules.

Also, as the switching operation time of the second switch element 133 is longer, the magnitude of the dark current flowing after the completion of the switching operation of the second switch unit 133 increases. Because the magnitude of the current may exceed the rated current of the power semiconductor element of the sub-module 10, all the sub-modules 10 may be damaged by a fire. Consequently, it is important to reduce the switching operation time of the second switch element 133.

Figure 3:
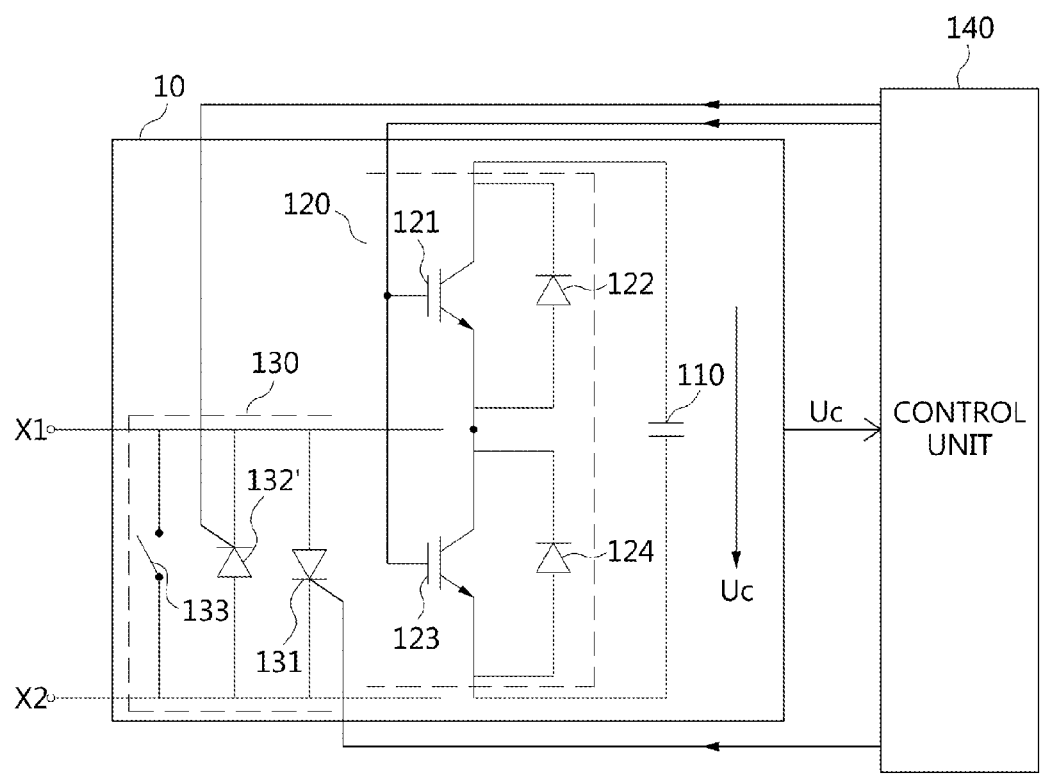
FIG. 3 is an equivalent circuit diagram of a sub-module according to another embodiment of the present invention.
Figure 4:
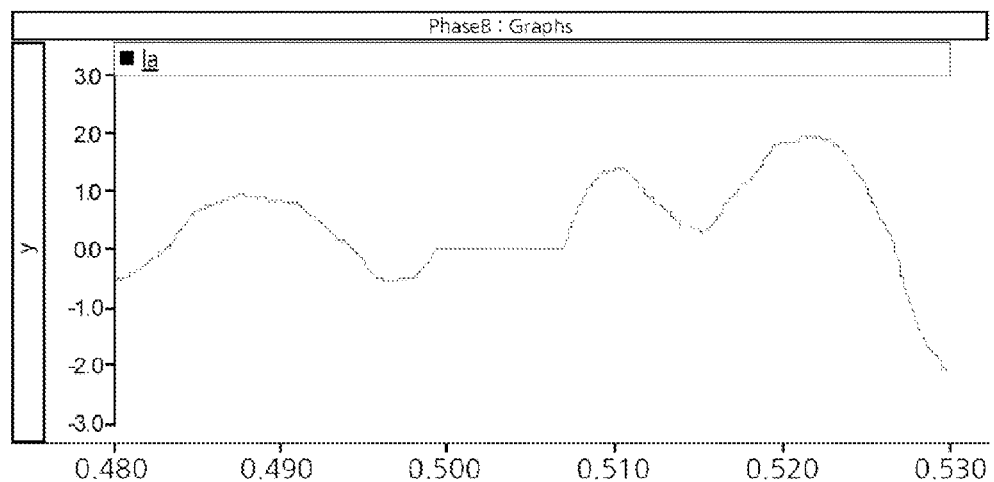
FIGS. 4 to 8 are graphs showing a dark current pattern depending on the operating time of a bypass switch unit, according to an embodiment of the present invention.
Figure 5:
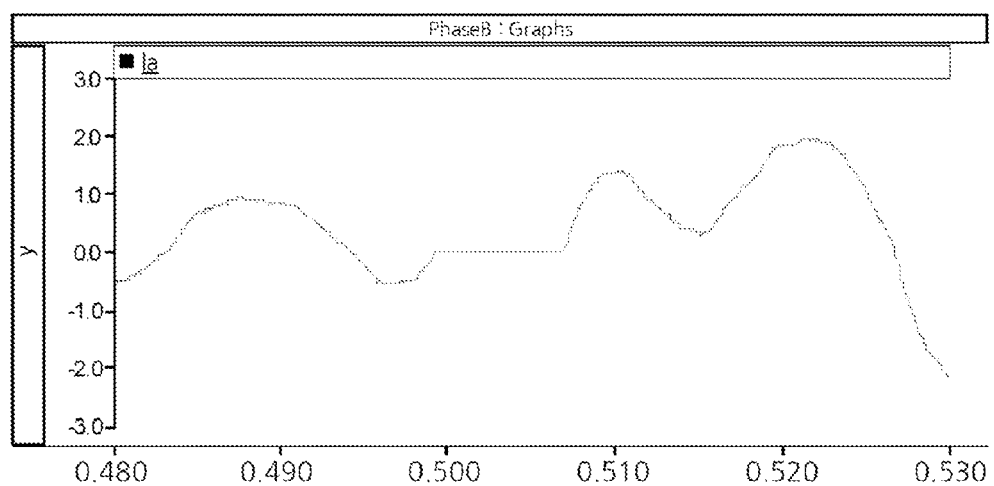
Figure 6:
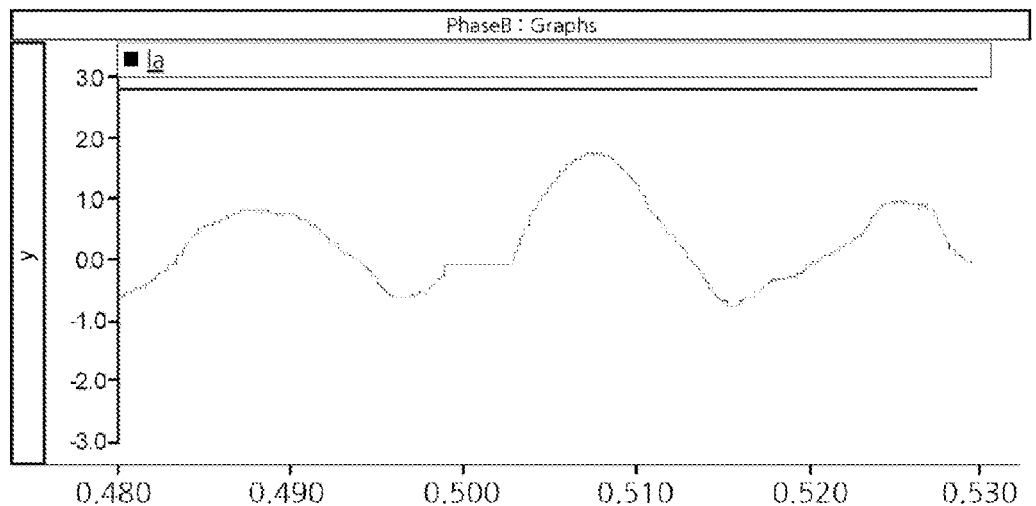
Figure 7:
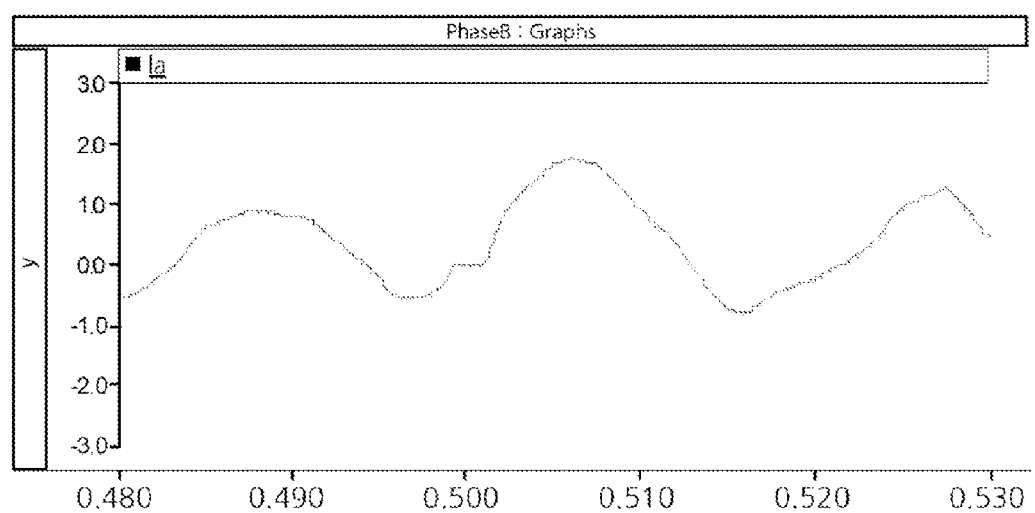
Figure 8:
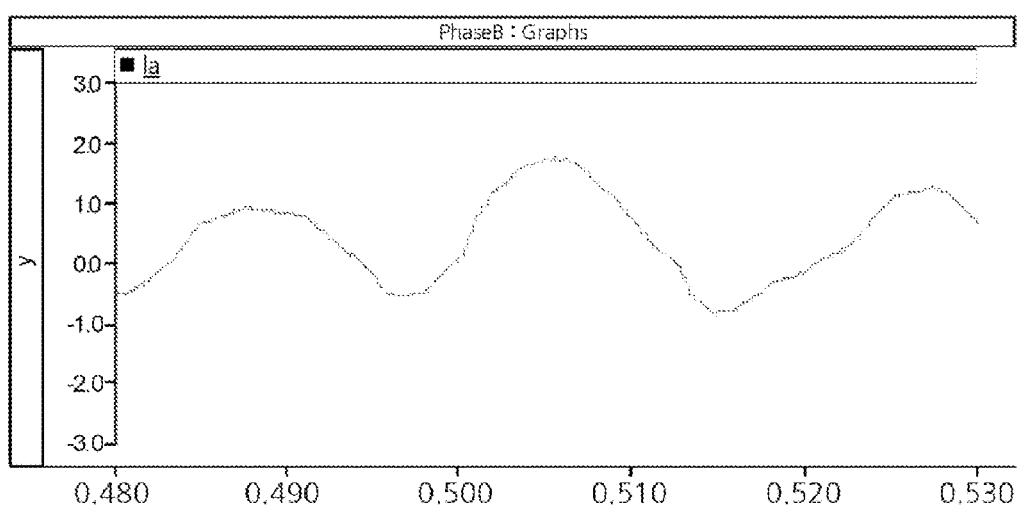

FIG. 3 is an equivalent circuit diagram according to another embodiment of the present invention.

Referring to FIG. 3, the sub-module 10 according to another embodiment of the present invention has a bypass switch unit 130, which is differently configured in some parts compared to the sub-module 10 according to the embodiment illustrated in FIG. 2. Specifically, in another embodiment of the present invention, the bypass switch unit 130 comprises a first switch unit 131, a third switch unit 132', and a second switch unit 133. In this case, it is desirable that the first and the third switch elements 131 and 132' have the same configuration, and may be implemented as a SCR element. The third switch element 132' is also turned on by the signal from the control unit 140. The anode side of the third switch element 132 is connected to the cathode side of the first switch element 131. In the operation of such a bypass switch unit 130, the instantaneous current flows to the third switch element 132' and the first switch element 131, same as FIG. 2, and then the current is bypassed through the second switch element 133 after the second switch element 133 is switched.

As described above, the bypass switch unit 130 according to another embodiment of the present invention is connected to any one among the power semiconductor circuits 120. Desirably, the bypass switch unit 130 is connected to the power semiconductor circuit that is connected between two output terminals X1 and X2 of the sub-module 10.

FIGS. 4 to 8 are graphs showing the pattern of a dark current depending on the operation time of a bypass switch unit according to an embodiment of the present invention.

FIGS. 4, 5, 6, 7, and 8 illustrate a dark current pattern when the operating time of the bypass switch unit is 10 ms, 8 ms, 6 ms, 4 ms, and 2 ms, respectively. As shown in FIGS. 4 to 8, as the bypass operation time in the bypass switch unit 130 is shorter, the dark current comes near to a sine wave. This means that the voltage accumulated in the energy storage unit in the phase module comes close to a sine wave as the bypass operation time is shorter.

As described above, optimal embodiments of the present invention have been disclosed in the drawings and the specification. Although specific terms have been used in the present specification, these are merely intended to describe the present invention, and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

The invention claimed is:

1. An electric power converter, comprising multiple sub-modules connected with each other in series,
    wherein each of the multiple sub-modules includes an energy storage unit and one or more power semiconductor circuits connected to the energy storage unit in parallel,
    wherein each of the one or more power semiconductor circuits includes multiple power semiconductor switches and free-wheel diodes,
    wherein each of the sub-modules further includes a bypass switch unit that is connected to one of the one or more power semiconductor circuits and disposed between two output terminals,
    wherein the electric power converter is configured to bypass a current through the bypass switch unit, and
    wherein:
    the bypass switch unit includes a first switch element connected to the one of the one or more power semiconductor circuits, a diode connected to the first switch element in anti-parallel, and a second switch element connected to the diode in parallel;
    a cathode side of the first switch element is connected to an emitter side of one of the multiple power semiconductor switches of the one of the one or more power semiconductor circuits; and
    the current flows through the diode and the first switch element when the sub-module fails, and the current is bypassed through the second switch element after a switching operation of the second switch element.

2. The electric power converter of claim 1, wherein the first switch element includes a semiconductor switch or a power semiconductor switch, and the second switch element includes a mechanical switch.

3. The electric power converter according to claim 1, wherein the first switch element includes an SCR.

4. An electric power converter, comprising multiple sub-modules connected with each other in series,
    wherein each of the multiple sub-modules includes an energy storage unit and one or more power semiconductor circuits connected to the energy storage unit in parallel,
    wherein each of the one or more power semiconductor circuits includes multiple power semiconductor switches and free-wheel diodes,
    wherein each of the sub-modules further includes a bypass switch unit that is connected to one of the one or more power semiconductor circuits between two output terminals,
    wherein the electric power converter is configured to bypass a current through the bypass switch unit, and
    wherein:
    the bypass switch unit includes a first switch element connected in parallel to the one of the one or more power semiconductor circuits and disposed between the two output terminals, a third switch element connected to the first switch element in anti-parallel, and a second switch element connected to the third switch element in parallel;
    a cathode side of the first switch element is connected to an emitter side of one of the multiple power semiconductor switches (123) of the one of the one or more power semiconductor circuits (120); and
    the current flows through the third switch element and the first switch element when the sub-module fails, and the current is bypassed through the second switch element after a switch operation of the second switch element.

5. The electric power converter of claim 4, wherein the first switch element and the third switch element respectively include an SCR element.

6. The electric power converter of claim 5, wherein an anode side of the third switch element is connected to the cathode side of the first switch element.

7. The electric power converter according to claim 1, wherein a switching operation time of the second switch element is 6 to 10 milliseconds.

8. The electric power converter according to claim 2, wherein the first switch element includes an SCR.

9. The electric power converter according to claim 4, wherein a switching operation time of the second switch element is 6 to 10 milliseconds.

* * * * *